G. A. MOORE.
BUNG FLANGE BLANK.
APPLICATION FILED JULY 13, 1921.
1,427,616.
Patented Aug. 29, 1922.
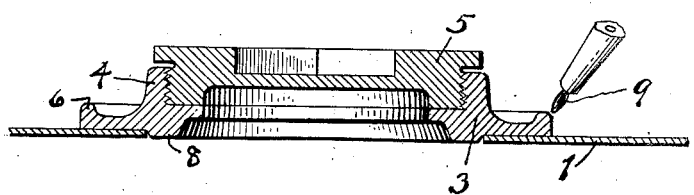
Fig. 1.
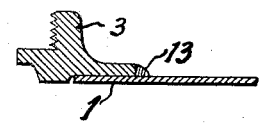
Fig. 4.
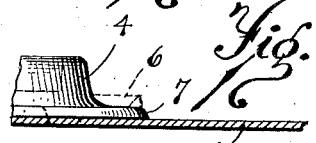
Fig. 2.
Fig. 5.
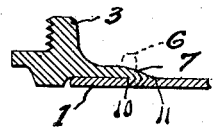
Fig. 6.
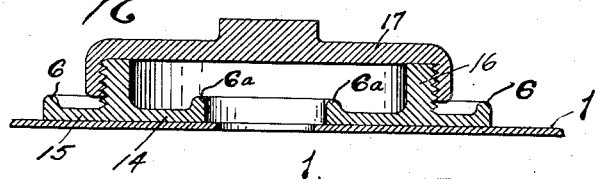
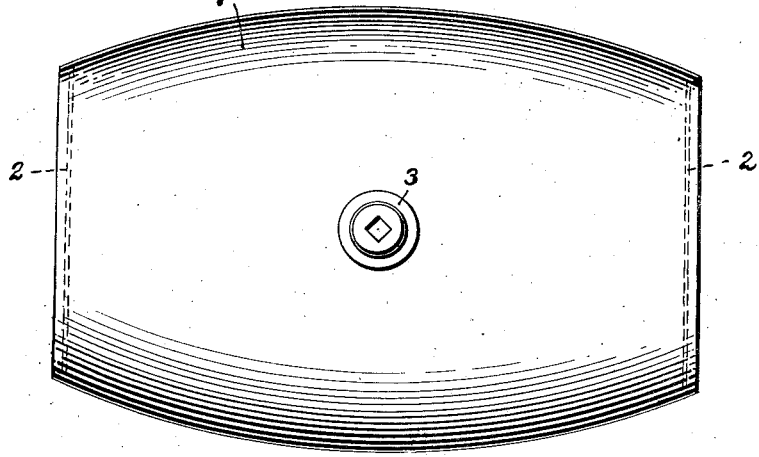
Fig. 3.
INVENTOR.
BY George A. Moore
Edward N. Pagelsen
ATTORNEY.

UNITED STATES PATENT OFFICE.

GEORGE A. MOORE, OF DETROIT, MICHIGAN, ASSIGNOR TO DETROIT RANGE BOILER & STEEL BARREL COMPANY, OF DETROIT, MICHIGAN, A CORPORATION OF MAINE.

BUNG-FLANGE BLANK.

1,427,616.     Specification of Letters Patent.     Patented Aug. 29, 1922.

Application filed July 13, 1921. Serial No. 484,308.

*To all whom it may concern:*

Be it known that I, GEORGE A. MOORE, a citizen of the United States, and residing at Detroit, in the county of Wayne and State of Michigan, have invented a new and Improved Bung-Flange Blank, of which the following is a specification.

This invention relates to the fittings or flanges which are intended to receive the bungs of barrels, casks, drums, or other containers, and its object is to provide a device of this character which can be readily welded to the shell or head of the container without the use of welding wire.

This invention consists in a flange having a raised circumferential rim or bead which may be readily melted by the electric arc or by oxy-acetylene flames or other suitable process and thus avoid the use of welding wire.

In the accompanying drawing, Fig. 1 is a central section of a bung flange positioned on a container shell. Fig. 2 is an elevation of a portion of such a flange welded to the container. Fig. 3 is a plan of a container with a bung flange in position. Fig. 4 is a section of the present type of flange welded to a container shell. Fig. 5 is a section of a modified form of flange and cap. Fig. 6 is a section of the flange indicating the weld between it and the shell of the container.

Similar reference characters refer to like parts throughout the several views.

Bung flanges 3 are usually attached to container bodies and heads 1 by welding, the flame of the blue-pipe or the electric arc being directed onto the edge of the flange and the container body until they are melted. At this time a wire of suitable composition is placed in the flame and enough metal melted from it to unite the melted parts of the flange and container. The location of the metal melted from the welding wire is indicated at 13 in Fig. 4.

In Figs. 1, 2 and 3, I have shown a container 1 having heads 2 indicated by dotted lines, and a circular bung flange 3 provided with a circular internally threaded portion 4 into which the plug 5 is fitted. The present flange differs from those now in use in being provided with the circumferential rim or bead 6 which may be of any suitable cross section and which takes the place of the welding wire commonly used. This bead readily melts under the applied heat, such as that of the flame 9 of the blow pipe, and flows down onto the container 1 and unites therewith, as indicated in Fig. 6, producing solid metal between the points 10 and 11, thereby constituting a rounded edge 7.

While the flange may be formed with a circumferential shoulder 8 in order to position it on the container, this is not necessary. It is clear that the flange may be formed with a bead 6ª along the internal edge of the part 14 of a flange 15, as shown in Fig. 5, as well as with the bead 6, and that the flange may be formed with an externally threaded portion 16 to receive the cap 17.

When the flange has a rim 6 no welding wire is required and its expense and difficulty of handling are avoided. It is much easier and quicker to bring two pieces to the melting point and then allow them to unite than to do this with three pieces and the chances for leakage or other defects in the weld are much less. It is much more difficult to obtain three than two pieces of metal of the same proper qualities and composition, which are factors of great importance in obtaining good welds.

This rim or bead 6 may be formed along the edge of any other metal article which is to be welded in position and the shape and dimensions of this bead may be changed by those skilled in the art.

I claim:—

1. Two members adapted to be welded together, one of said members overlapping the other and having a rim or bead along an edge, which bead is adapted to be melted so it will attach itself to the other member.

2. A bung flange having an outer edge adapted to overlap the container to which it is to be attached and an upstanding rim or bead along its outer edge adapted to be melted to attach the flange to the container.

3. An annular metal bung flange having upstanding rims or beads along its outer and inner edges adapted to be melted to attach the flange to another piece of metal.

GEO. A. MOORE.